United States Patent
Lv et al.

(10) Patent No.: US 11,315,345 B2
(45) Date of Patent: Apr. 26, 2022

(54) METHOD FOR DIM AND SMALL OBJECT DETECTION BASED ON DISCRIMINANT FEATURE OF VIDEO SATELLITE DATA

(71) Applicant: BEIJING UNIVERSITY OF CIVIL ENGINEERING AND ARCHITECTURE, Beijing (CN)

(72) Inventors: Jingguo Lv, Beijing (CN); Yifei Cao, Beijing (CN); Ningning Qu, Beijing (CN); Tingrui Hu, Beijing (CN)

(73) Assignee: BEIJING UNIVERSITY OF CIVIL ENGINEERING AND ARCHITECTURE

( * ) Notice: Subject to any disclaimer, the term of this patent is extended or adjusted under 35 U.S.C. 154(b) by 0 days.

(21) Appl. No.: 17/411,328

(22) Filed: Aug. 25, 2021

(65) Prior Publication Data

US 2022/0067335 A1    Mar. 3, 2022

(30) Foreign Application Priority Data

Aug. 26, 2020   (CN) .......................... 202010872520.7

(51) Int. Cl.
*G06K 9/62*  (2022.01)
*G06V 20/13*  (2022.01)
*G06V 20/40*  (2022.01)
*G06V 20/64*  (2022.01)

(52) U.S. Cl.
CPC ........... *G06V 20/13* (2022.01); *G06K 9/6234* (2013.01); *G06K 9/6267* (2013.01); *G06K 9/6288* (2013.01); *G06V 20/41* (2022.01); *G06V 20/64* (2022.01)

(58) Field of Classification Search
CPC ........ G06V 20/13; G06V 20/64; G06V 20/41; G06K 9/6234; G06K 9/6267; G06K 9/6288

See application file for complete search history.

(56) References Cited

U.S. PATENT DOCUMENTS

2020/0234461 A1 *   7/2020   Osumi ..................... G06T 7/62

OTHER PUBLICATIONS

Chen et al, "Geospatial Object Detection in Remote Sensing Imagery Based on Multiscale Single-Shot Detector with Activated Semantics," 2018, Remote Sens. 2018, 10,820 (21 Pages) (Year: 2018).*

* cited by examiner

*Primary Examiner* — David F Dunphy
(74) *Attorney, Agent, or Firm* — Polsinelli PC (57) ABSTRACT

A method for detecting a dim and small object based on a discriminant feature of video satellite data is provided. The method makes full use of the discriminant feature to improve detection accuracy of the dim and small object. A symmetric semantic segmentation model and an autoencoder model are used to extract the discriminant feature of an object. A top-down adjustment mechanism is used to fuse an image feature and the discriminant feature of the object. Then an attention mechanism is used to enhance a background to further increase contrast between the object and the background. A multi-scale semantic analysis strategy is introduced, and a pyramid model is used to extract the dim and small object in the video satellite data.

9 Claims, 4 Drawing Sheets

METHOD FOR DIM AND SMALL OBJECT DETECTION BASED ON DISCRIMINANT FEATURE OF VIDEO SATELLITE DATA

CROSS REFERENCE TO RELATED APPLICATION

This patent application claims the benefit and priority of Chinese Patent Application No. 202010872520.7 filed on Aug. 26, 2020, the disclosure of which is incorporated by reference herein in its entirety as part of the present application.

TECHNICAL FIELD

The present disclosure relates to the technical field of remote sensing information processing, and in particular, to a method for detecting a dim and small object based on a discriminant feature of video satellite data.

BACKGROUND ART

In the conventional art, there are mature technologies for detecting a dim and small object based on ground video data. Classical methods for detecting a moving object mainly include a frame difference method, a background subtraction method, and an optical flow method. For the foregoing methods, used feature descriptors include a Haar feature, a scale-invariant feature transform (SIFT) feature, a histogram of oriented gradients (HOG) feature and so on, and classifiers include logistic regression, a decision tree, Adaboost, support vector machines (SVMs) and so on. Feature extraction algorithms of such methods are highly dependent on rationality of manual settings, and have a poor generalization ability, resulting in limited application scenarios.

In recent years, many object detection algorithms based on deep learning have been proposed for detecting the dim and small object by using the ground video data. Based on a large amount of labeled data and with a network model design as a core, such algorithms can be used to detect a general object. The algorithms mainly include two types: two-stage algorithm and one-stage algorithm. The two-stage algorithm first extracts features by using a convolutional neural network (CNN) to obtain candidate regions, and then locates and classifies the candidate regions by using the classifier. Typical algorithms include Region-CNN (R-CNN), Faster R-CNN, spatial pyramid pooling network (SPP-Net) and so on. This type of algorithm can greatly improve accuracy of object detection. However, a detection speed is unsatisfactory because it takes a lot of computing time to generate the candidate regions. The one-stage algorithm, instead of generating the candidate regions, directly extracts features in a network for object classification and position prediction. Typical algorithms include you only look once (YOLO) v1, YOLO v3, and single-shot Multibox detector (SSD). The one-stage algorithm can greatly improve the speed of the object detection. However, due to a restriction of a grid framework on the number of grid cells, the one-stage algorithm is difficult to achieve the accuracy level of the two-stage algorithm. In addition, the dim and small object occupies few pixels in video data, and thus has few features. Some researchers have proposed solutions from three aspects: sample, scale, and semantic information fusion, to resolve problems in the detection of the dim and small object.

However, there are many differences between video satellite data and the ground video data, in shooting angles, observation angles, sensor carrying platforms, spatial resolutions, imaging methods, and image contrasts, such that technologies for detecting the dim and small object based on the ground video data cannot be directly applied to the video satellite data. Therefore, there are technical difficulties in detecting the dim and small object based on the video satellite data.

In addition, in an existing video image detection and processing technology, typical deep learning models are often rooted in similarity learning, focusing on representation of the feature of an object. Discrimination learning also focuses on the feature of the object, but this feature is an object-specific feature that is inconsistent with a background, namely, the discriminant feature. The discriminant feature is of great significance to an image recognition process. However, there are relatively few applications of discrimination learning at present. Therefore, how to improve efficiency of extracting the discriminant feature, accurately extract a background discriminant feature of the video satellite data, and effectively apply the discriminant feature in an image processing process is of great significance for image recognition or object detection for a video object.

SUMMARY

The present disclosure intends to provide a method for detecting a dim and small object based on a discriminant feature of video satellite data to resolve the foregoing problems in the conventional art.

To achieve the foregoing effects, the present disclosure adopts the following technical solution:

A method for detecting a dim and small object based on a discriminant feature of video satellite data includes:

S1: cutting an image obtained from a video satellite into image blocks with the same size and inputting the image blocks into a VGG16 backbone network to obtain an image feature of the video satellite data;

S2: performing data annotation on the cut image blocks, taking an annotation region obtained by the data annotation as a range for extracting a discriminant feature, and extracting the discriminant feature of an object by adopting a symmetric semantic segmentation model and an autoencoder network model;

S3: fusing the image feature of the video satellite data and the extracted discriminant feature of the object by utilizing a top-down adjustment mechanism;

S4: by utilizing an attention mechanism, performing background enhancement on a background of a segmented image obtained after segmentation by the symmetric semantic segmentation model in step S2 to further increase contrast between the object and the background; and S5: fusing multi-scale information of the object in an object detection algorithm to extract the dim and small object in the video satellite data by introducing a multi-scale semantic analysis strategy and adopting a pyramid model.

In an embodiment, the cutting in step S1 includes:

cutting the image into fragments with the same pixel size by way of a sliding window, and performing zero filling on boundary parts with insufficient pixels to ensure that all of the fragments are of the same size and adjacent fragments have an overlapping region of 15%.

In an embodiment, the fragments with the same pixel size each have 224×224 pixels.

In an embodiment, step S2 includes:

S21: training the symmetric semantic segmentation model online by adopting a UC Merced dataset, to more effectively obtain the image feature of the video satellite data;

S22: performing semantic segmentation on the video satellite data by using the trained symmetric semantic segmentation model to obtain a series of image feature maps, to obtain region blocks with specific semantic meanings, and identifying a semantic classification of each region block to obtain a segmented image with pixel-by-pixel semantic annotation;

S23: establishing a feature screening mechanism, and screening out the image feature of the object with semantics from the segmented image based on an object template of the annotation region; and S24: performing semantic information optimization and reconstruction on the image feature of the object by using the autoencoder network model to obtain the discriminant feature that is significantly different from the background, to extract the discriminant feature of the object in the video satellite data.

In an embodiment, step S21 includes:

A1: selecting the UC Merced dataset, where the UC Merced dataset includes a multiple of terrain classifications;

A2: selecting the terrain classifications in the UC Merced dataset to train the symmetric semantic segmentation model online in a targeted manner; and A3: obtaining the trained symmetric semantic segmentation model and proceeding to step S22.

In an embodiment, in step A3:

the trained symmetric semantic segmentation model includes a feature extraction part and an upsampling part. The feature extraction part gradually displays background information through downsampling. The upsampling part restores detailed information based on feature maps generated during the downsampling and feature maps generated during previous upsampling to gradually restore to accuracy of an original image, and outputs maximum values of different classifications by a classifier to obtain a final segmentation result.

In an embodiment, the establishing the feature screening mechanism in step S23 includes:

matching the object template of the annotation region with the region blocks in the segmented image to extract feature points by using an SIFT algorithm; and specifically, the feature screening mechanism is established, an SIFT key point in the object template of the annotation region is selected, two key points with shortest and second shortest Euclidean distances to the SIFT key point in the segmented image are found, and under a condition that a ratio of the shortest distance to the second shortest distance is less than a threshold T, this pair of matching points are accepted, otherwise, the pair of matching points are eliminated, to screen out the image feature of the object with semantics.

The threshold T is 0.55 to ensure a large number of matching points and relatively high matching accuracy.

In an embodiment, step S3 includes:

S31: performing convolution and pooling on the discriminant feature extracted in step S2 to generate a discriminant feature map with c channels, and performing 1×1 convolution for c times on the image feature obtained in step S1 to make a number of channels and a size of the image feature same as those of the discriminant feature map; and S32: weighting and averaging corresponding elements of the discriminant feature map with c channels and the image feature obtained after c times of 1×1 convolution, to implement information fusion of the image feature in S1 and the discriminant feature in S2.

In an embodiment, step S4 includes:

S41: taking the discriminant feature of the object as an input, expressed as $x_{1:N}=[x_1, \ldots, x_N]$, $i=1, \ldots, N$, and selecting a part of beneficial information from the input for processing;

S42: giving query information q related to a current task or scenario of a model, and taking an attention variable $Z \in [1,N]$ to represent a position of the selected information, where $z=i$ indicates that input feature information with a sequence number i is selected; and S43: by using soft attention, taking an attention weight $\alpha_i$ to represent a possibility of selecting respective input information, and applying the attention weight $\alpha_i$ to the feature to select the feature.

A process of generating the attention weight $\alpha_i$ is as follows:

$$\alpha_i = p(z = i \mid x_{1:N}, q)$$
$$= \text{softmax}_i(s(x_i, q))$$
$$= \frac{\exp(s(x_i, q))}{\sum_{j=i}^{N} \exp(s(x_i, q))}$$

where $s(x_i,q)$ represents an attention scoring function, which needs to be selected based on the task and model of the attention mechanism, and $s(x_i,q)$ is provided by external relevant supervision information or generated by the model based on an input feature. After the attention weight $\alpha_i$ is obtained, the attention weight $\alpha_i$ is applied to the feature to select the feature. An action process of the attention weight $\alpha_i$ on information is expressed by the following expression:

$$\text{attention}(x_{1:N}, q) = \sum_{i=1}^{N} \alpha_i x_i = E_{z \sim p_q(Z|x_i)}[x]$$

In an embodiment, step S5 includes:

S51: simulating a perception process from coarse to fine in a human visual system by the multi-scale semantic analysis strategy; where for an object detection of the video satellite data, high-scale data are used to detect small objects, and low-scale data are used to detect large objects;

S52: constructing a multi-level feature pyramid structure and a feature pyramid, where high-level features are conducive to classification, and low-level features are conducive to regression of a position of the object, and the feature pyramid is stacked by adopting the multi-level feature pyramid structure to provide a multi-level feature pyramid connection structure; and S53: encoding and decoding the discriminant feature by using a U-shaped network, weighting and splicing feature channels with a same scale among different layers in the feature pyramid connection structure, and performing multi-scale prediction based on the obtained discriminant feature to detect the dim and small object in the video satellite data.

The present disclosure has the following beneficial effects:

The present disclosure provides a method for detecting the dim and small object based on the discriminant feature of the video satellite data. The method makes full use of the discriminant feature to improve detection accuracy of the dim and small object. The symmetric semantic segmentation model and the autoencoder network model are used to extract the discriminant feature of the object. The top-down adjustment mechanism is used to fuse the image feature and the discriminant feature of the object. Then the attention mechanism is used to enhance the background to further increase the contrast between the object and the background. The multi-scale semantic analysis strategy is introduced, and the pyramid model is used to extract the dim and small object in the video satellite data. The present disclosure focuses on extraction and introduction of the discriminant feature of the dim and small object, and adopts the attention mechanism to further increase the contrast between the object and the background, so as to greatly improve the detection accuracy of the dim and small object in the video satellite.

DETAILED DESCRIPTION OF THE EMBODIMENTS

To make the effects, technical solutions, and advantages of the present disclosure clearer, the following describes the present disclosure in more detail with reference to the accompanying drawings. It should be understood that the embodiments described herein are merely intended to explain but not to limit the present disclosure.

Embodiment

Figure 1:
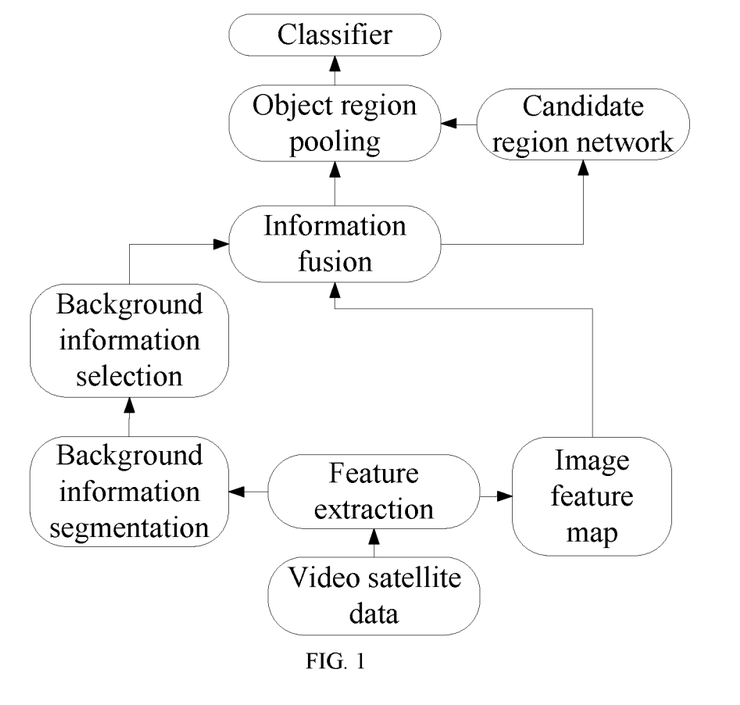
FIG. 1 is a schematic flowchart of a method for detecting a dim and small object according to Embodiment 1.

This embodiment provides a method for detecting a dim and small object based on a discriminant feature of video satellite data. As shown in FIG. 1, the method includes the following steps:
S1: cutting an image obtained from a video satellite into image blocks with the same size and inputting the image blocks into a VGG16 backbone network to obtain an image feature of the video satellite data;
S2: performing data annotation on the cut image blocks, taking an annotation region obtained by the data annotation as a range for extracting a discriminant feature, and extracting the discriminant feature of an object by adopting a symmetric semantic segmentation model and an autoencoder network model;
S3: fusing the image feature of the video satellite data and the extracted discriminant feature of the object by utilizing a top-down adjustment mechanism;
S4: by utilizing an attention mechanism, performing background enhancement on a background of a segmented image obtained after segmentation by the symmetric semantic segmentation model in step S2 to further increase contrast between the object and the background; and
S5: fusing multi-scale information of the object in an object detection algorithm to extract the dim and small object in the video satellite data by introducing a multi-scale semantic analysis strategy and adopting a pyramid model.

In this embodiment, the cutting in step S1 specifically includes:
cutting the whole image into fragments with the same pixel size by way of a sliding window, and performing zero filling on boundary parts with insufficient pixels to ensure that all of the fragments are of the same size and adjacent fragments have an overlapping region of 15%.
The fragments with the same pixel size each have 224× 224 pixels.

In this embodiment, step S2 specifically includes the following steps S21-S24.
S21: training the symmetric semantic segmentation model online by adopting a UC Merced dataset, to more effectively obtain the image feature of the video satellite data;
S22: performing semantic segmentation on the video satellite data by using the trained symmetric semantic segmentation model to obtain a series of image feature maps, to finally obtain region blocks with specific semantic meanings, and identifying a semantic classification of each region block to obtain a segmented image with pixel-by-pixel semantic annotation;
S23: establishing a feature screening mechanism, and screening out the image feature of the object with semantics from the segmented image based on an object template of the annotation region; and
S24: performing semantic information optimization and reconstruction on the image feature of the object by using the autoencoder network model to obtain the discriminant feature that is significantly different from the background, to extract the discriminant feature of the object in the video satellite data.

Figure 3:
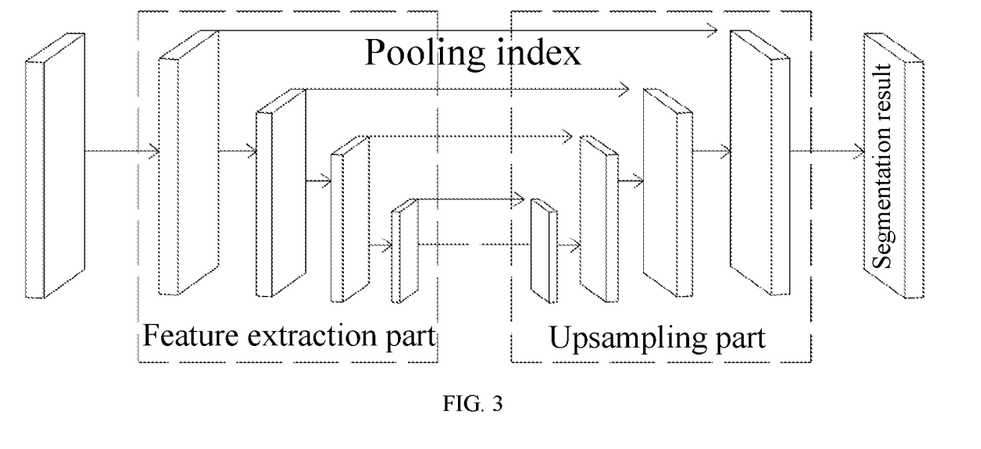
FIG. 3 is a schematic structural diagram of a symmetric semantic segmentation model adopted in Embodiment 1.
Figure 4:
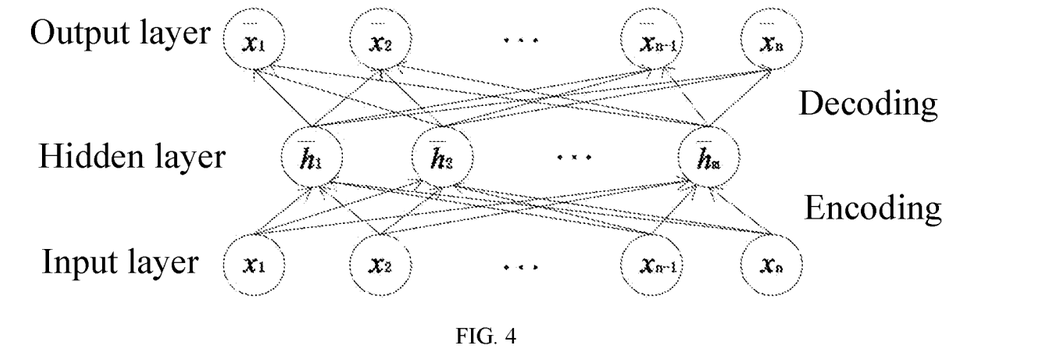
FIG. 4 is a schematic structural diagram of an autoencoder network model adopted in Embodiment 1.

Step S21 specifically includes the following steps A1-A3.
A1: constructing the UC Merced dataset which includes various terrain classifications.
A2: selecting the terrain classifications in the UC Merced dataset, and selecting different terrain classifications for a keyword, background, to train the symmetric semantic segmentation model; and
A3: finally obtaining the trained symmetric semantic segmentation model to proceed to step S22.
In step A3:
The trained symmetric semantic segmentation model includes a feature extraction part and an upsampling part, as shown in FIG. 3. The feature extraction part gradually displays background information through downsampling. The upsampling part restores detailed information based on feature maps generated during the downsampling and feature maps generated during previous upsampling to gradually restore to accuracy of an original image, and finally outputs maximum values of different classifications by a classifier to obtain a final segmentation result.
The UC Merced dataset includes 21 terrain classifications, and each classification contains 100 images, and the total number of images is 2,100. Further, each image has 256×256 pixels with pixel resolution of 1 foot.

In this embodiment, the establishing the feature screening mechanism in step S23 specifically includes:
matching the object template of the annotation region with the region blocks in the segmented image to extract feature points by using an SIFT algorithm.

Step S23 may specifically include: establishing the feature screening mechanism, selecting an SIFT key point in the object template of the annotation region, finding two key points with shortest and second shortest Euclidean distances to the SIFT key point in the segmented image, and under a condition that a ratio of the shortest distance to the second shortest distance is less than a threshold T, accepting this pair of matching points, otherwise, eliminating this pair of matching points, to screen out the image feature of the object with semantics. The threshold T is 0.05 in this embodiment.

Figure 2:
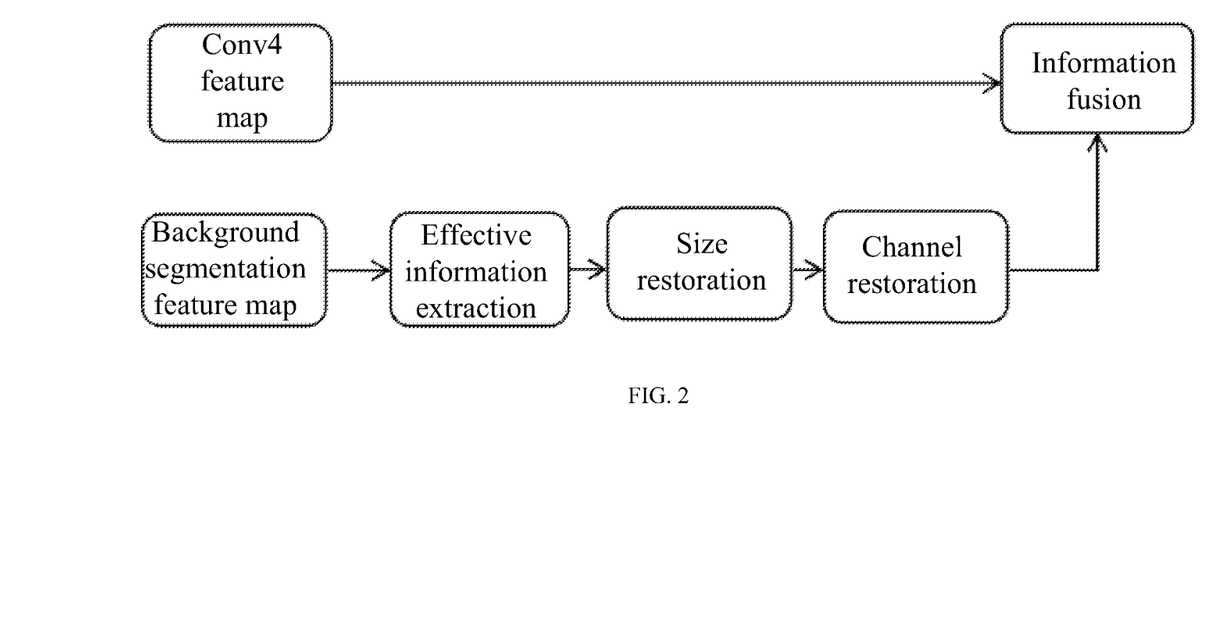
FIG. 2 is a diagram of a process of extracting and fusing image information of the dim and small object according to Embodiment 1.

In this embodiment, step S3 specifically includes the following steps:

S31: performing convolution and pooling on the discriminant feature extracted in step S2 to generate a discriminant feature map with c channels, and performing 1×1 convolution for c times on the image feature obtained in step S1 to make the number of channels and a size of the image feature same as those of the discriminant feature; and S32: weighting and averaging corresponding elements of the discriminant feature map with c channels and the image feature obtained after c times of 1×1 convolution, to implement information fusion of the image feature S1 and the discriminant feature S2, as shown in FIG. 2.

Step S4 specifically includes the following steps:

S41: taking the discriminant feature of the object as an input, expressed as $x_{1:N} = [x_1, \ldots, x_N]$, $i=1, \ldots, N$, and selecting a part of beneficial information from the input for processing;

S42: giving query information q related to a current task or scenario of a model, and taking an attention variable $Z \in [1, N]$ to represent a position of the selected information, where z=i indicates that input feature information with a sequence number i is selected; and S43: by using soft attention, taking an attention weight $\alpha_i$ to represent a possibility of selecting respective input information, and applying the attention weight $\alpha_i$ to the feature to select the feature.

A process of generating the attention weight $\alpha_i$ is as follows:

$$\alpha_i = p(z = i \mid x_{1:N}, q)$$
$$= \text{softmax}_i(s(x_i, q))$$
$$= \frac{\exp(s(x_i, q))}{\sum_{j=i}^{N} \exp(s(x_j, q))}$$

where $s(x_i, q)$ represents an attention scoring function, which needs to be selected based on the task and model of the attention mechanism, and $s(x_i, q)$ may be provided by external relevant supervision information or generated by the model based on an input feature.

After the attention weight $\alpha_i$ is obtained, the attention weight $\alpha_i$ is applied to the discriminant feature to select the discriminant feature. An action process of the attention weight $\alpha^i$ a on information can be expressed by the following expression:

$$\text{attention}(x_{1:N}, q) = \sum_{i=1}^{N} \alpha_i x_i = E_{z \sim p_q(Z|x_i)}[x]$$

In this embodiment, step S5 specifically includes the following steps S51-S53.

Figure 5:
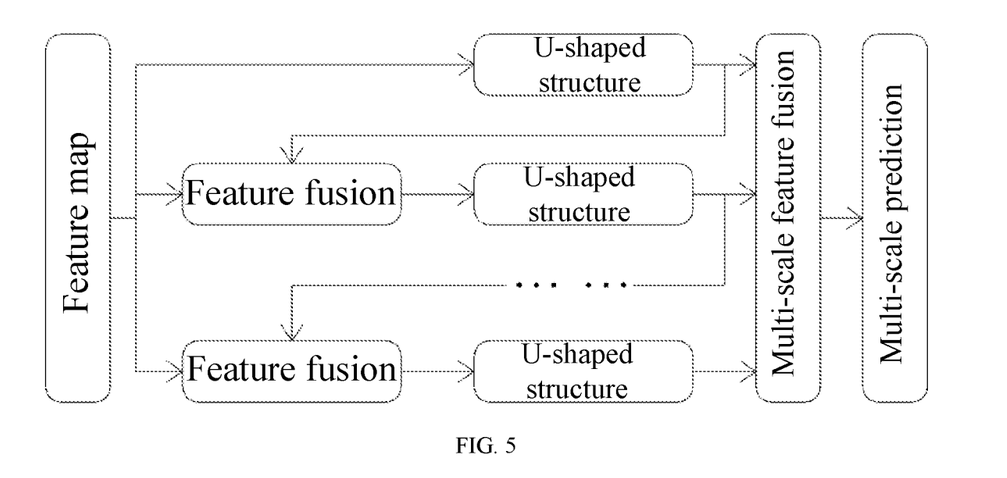
FIG. 5 is a schematic diagram of a multi-level feature pyramid connection structure constructed in Embodiment 1.
Figure 6:
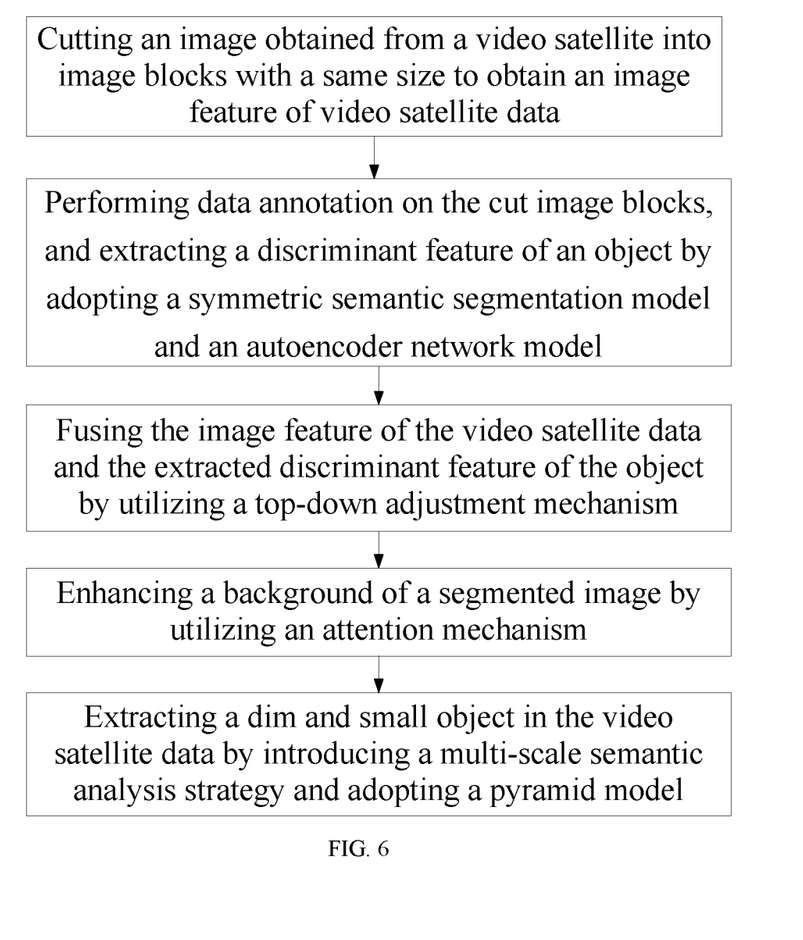
FIG. 6 is a flowchart of a method for detecting the dim and small object based on a discriminant feature of video satellite data according to Embodiment 1.

S51: by the multi-scale semantic analysis strategy, simulating a perception process from coarse to fine in a human visual system, where for an object detection of the video satellite data, high-scale data can be used to detect small objects, and low-scale data can be used to detect large objects;

S52: constructing a multi-level feature pyramid structure and a feature pyramid, where high-level features are conducive to classification, and low-level features are conducive to regression of a position of the object, and the feature pyramid is stacked by adopting the multi-level feature pyramid structure to provide a multi-level feature pyramid connection structure; and S53: encoding and decoding the discriminant feature by using a U-shaped network, weighting and splicing feature channels with the same scale among different layers in the feature pyramid connection structure, and performing multi-scale prediction based on the obtained discriminant feature to detect the dim and small object in the video satellite data.

The foregoing technical solutions adopted in the present disclosure has the following beneficial effects:

The present disclosure provides a method for detecting the dim and small object based on the discriminant feature of the video satellite data. The method makes full use of the discriminant feature to improve detection accuracy of the dim and small object. The symmetric semantic segmentation model and autoencoder network model are used to extract the discriminant feature of the object. The top-down adjustment mechanism is used to fuse the image feature and the discriminant feature of the object. Then the attention mechanism is used to enhance the background to further increase the contrast between the object and the background. The multi-scale semantic analysis strategy is introduced, and the pyramid model is used to extract the dim and small object in the video satellite data. The present disclosure focuses on extraction and introduction of the discriminant feature of the dim and small object, and adopts the attention mechanism to further increase the contrast between the object and the background, so as to greatly improve the detection accuracy of the dim and small object in the video satellite data.

The foregoing descriptions are merely some implementations of the present disclosure. It should be noted that several improvements and modifications may further be made by a person of ordinary skill in the art without departing from the principle of the present disclosure, and such improvements and modifications should also be deemed as falling within the protection scope of the present disclosure.

What is claimed is:

1. A method for detecting a dim and small object based on a discriminant feature of video satellite data, comprising:
    S1: cutting an image obtained from video satellite data into image blocks with a same size and inputting the image blocks into a VGG16 backbone network to obtain an image feature of the video satellite data;
    S2: performing data annotation on the cut image blocks, taking an annotation region obtained by the data annotation as a range for extracting a discriminant feature, adopting a symmetric semantic segmentation model to obtain a segmented image with pixel-by-pixel semantic annotation and extracting an image feature of an object that is significantly different from a background to obtain the discriminant feature of the object;
    S3: fusing the image feature of the video satellite data and the extracted discriminant feature of the object by utilizing a top-down adjustment mechanism;

S4: by utilizing an attention mechanism, performing background enhancement on a background of a segmented image obtained after segmentation by the symmetric semantic segmentation model in step S2 to further increase contrast between the object and the background; and S5: performing multi-scale fusion on fusion features with different scales in the image obtained by the background enhancement in S4, to extract the dim and small object in the video satellite data by introducing a multi-scale semantic analysis strategy and adopting a pyramid model;

wherein, S5 comprises:

S51: simulating a perception process from coarse to fine in a human visual system by the multi-scale semantic analysis strategy; wherein for an object detection of the video satellite data, high-scale data are used to detect small objects, and low-scale data are used to detect large objects;

S52: constructing a multi-level feature pyramid structure and a feature pyramid, wherein high-level features are conducive to classification, and low-level features are conducive to regression of a position of the object, and the feature pyramid is stacked by adopting the multi-level feature pyramid structure to provide a multi-level feature pyramid connection structure; and S53: encoding and decoding the discriminant feature by using a U-shaped network, weighting and splicing feature channels with a same scale among different layers in the feature pyramid connection structure, and performing multi-scale prediction based on the fusion features obtained in S3 to detect the dim and small object in the video satellite data.

2. The method for detecting the dim and small object based on the discriminant feature of the video satellite data according to claim 1, wherein the cutting in step S1 comprises:

cutting the image into fragments with a same pixel size by way of a sliding window, and performing zero filling on boundary parts with insufficient pixels to ensure that all of the fragments are of the same size and adjacent fragments have an overlapping region of 15%.

3. The method for detecting the dim and small object based on the discriminant feature of the video satellite data according to claim 2, wherein the fragments with the same pixel size each have 224×224 pixels.

4. The method for detecting the dim and small object based on the discriminant feature of the video satellite data according to claim 1, wherein step S2 comprises:

S21: training the symmetric semantic segmentation model online by adopting a UC Merced dataset, to more effectively obtain the image feature of the video satellite data;

S22: performing semantic segmentation on the video satellite data by using the trained symmetric semantic segmentation model to obtain a series of image feature maps, to obtain region blocks with specific semantic meanings, and identifying a semantic classification of each region block to obtain the segmented image with pixel-by-pixel semantic annotation;

S23: establishing a feature screening mechanism, and screening out the image feature of the object with semantics from the segmented image based on an object template of the annotation region; and S24: performing semantic information optimization and reconstruction on the image feature of the object by using the autoencoder network model to obtain the discriminant feature that is significantly different from the background, to extract the discriminant feature of the object in the video satellite data.

5. The method for detecting the dim and small object based on the discriminant feature of the video satellite data according to claim 4, wherein step S21 comprises:

A1: selecting the UC Merced dataset, wherein the UC Merced dataset comprises a plurality of terrain classifications;

A2: selecting the terrain classifications in the UC Merced dataset to train the symmetric semantic segmentation model online in a targeted manner; and A3: obtaining the trained symmetric semantic segmentation model and proceeding to step S22.

6. The method for detecting the dim and small object based on the discriminant feature of the video satellite data according to claim 5, wherein in step A3, the trained symmetric semantic segmentation model comprises a feature extraction part and an upsampling part, wherein the feature extraction part gradually displays background information through downsampling, and the upsampling part restores detailed information based on feature maps generated during the downsampling and feature maps generated during previous upsampling to gradually restore to accuracy of an original image, and outputs maximum values of different classifications by a classifier to obtain a final segmentation result.

7. The method for detecting the dim and small object based on the discriminant feature of the video satellite data according to claim 4, wherein the establishing the feature screening mechanism in step S23 comprises:

matching the object template of the annotation region with the region blocks in the segmented image to extract feature points by using a scale-invariant feature transform (SIFT) algorithm;

wherein, the feature screening mechanism is established, an SIFT key point in the object template of the annotation region is selected, two key points with shortest and second shortest Euclidean distances to the SIFT key point in the segmented image are found, and under a condition that a ratio of the shortest distance to the second shortest distance is less than a threshold T, this pair of matching points are accepted, otherwise, the pair of matching points are eliminated, to screen out the image feature of the object with semantics.

8. The method for detecting the dim and small object based on the discriminant feature of the video satellite data according to claim 1, wherein step S3 comprises:

S31: performing convolution and pooling on the discriminant feature extracted in step S2 to generate a discriminant feature map with c channels, and performing 1×1 convolution for c times on the image feature obtained in step S1 to make a number of channels and a size of the image feature same as those of the discriminant feature map; and S32: weighting and averaging corresponding elements of the discriminant feature map with c channels and the image feature obtained after c times of 1×1 convolution, to implement information fusion of the image feature and the discriminant feature.

9. The method for detecting the dim and small object based on the discriminant feature of the video satellite data according to claim 1, wherein step S4 comprises:
- S41: taking the discriminant feature of the object as an input, expressed as $x_{1:N} = [x_1, \ldots, x_N]$, $i=1, \ldots, N$, and selecting a part of beneficial information from the input for processing;
- S42: giving query information q related to a current task or scenario of a model, and taking an attention variable $Z \in [1,N]$ to represent a position of the selected information, wherein z=i indicates that input feature information with a sequence number i is selected; and
- S43: by using soft attention, taking an attention weight $\alpha_i$ to represent a possibility of selecting respective input information, and applying the attention weight $\alpha_i$ to the feature to select the feature; wherein a process of generating the attention weight $\alpha_i$ is as follows:

$$\alpha_i = p(z=i \mid x_{1:N}, q)$$
$$= \mathrm{softmax}_i(s(x_i, q))$$
$$= \frac{\exp(s(x_i, q))}{\sum_{j=i}^{N} \exp(s(x_i, q))}$$

wherein $s(x_i, q)$ represents an attention scoring function, which needs to be selected based on the task and model of the attention mechanism, and $s(x_i, q)$ is provided by external relevant supervision information or generated by the model based on an input feature; and applying the attention weight $\alpha_i$ et to the discriminant feature after the attention weight $\alpha_i$ is obtained, to select the discriminant feature, wherein an action process of the attention weight $\alpha^i$ on information is expressed by the following expression:

$$\mathrm{attention}(x_{1:N}, q) = \sum_{i=1}^{N} \alpha_i x_i = E_{z \sim p_q(z \mid x_i)}[x].$$

* * * * *